3,022,339
PRODUCTION OF UNSATURATED MONO-
CARBOXYLIC ACID ESTERS
Eduard Enk and Fritz Knörr, Burghausen, Upper Bavaria, Germany, assignors to Wacker-Chemie G.m.b.H., Munich, Germany
No Drawing. Filed June 23, 1959, Ser. No. 822,219
Claims priority, application Germany July 5, 1958
7 Claims. (Cl. 260—486)

The present invention relates to an improved process for the production of unsaturated monocarboxylic acid esters from alpha- or beta-alkoxy or aryloxy substituted monocarboxylic acid esters employing mixed silica containing catalysts.

It is known that acrylic esters can be prepared by treating beta-alkoxy propionic acid esters in the liquid or gaseous phase with dehydrating agents, such as sulfuric or acid (German Patent No. 573,724). Volatile acidic organic sulfur compounds which reduce the stability of the acrylic acid esters produced were produced as by-products in such reaction in view of reduction reactions. Furthermore, the yields obtainable were variable in view of losses engendered by polymerization. In the case of acrylic acid methyl ester the yields attained were between 68.5 and 80%.

The production of alpha-beta unsaturated esters by splitting off alcohol from beta-alkoxy substituted propionic or isobutyric acid esters in the liquid phase in the presence of sodium alcoholate has been described in U.S. Patent No. 2,393,737. It has also been proposed to improve the yields and increase the velocity of the reaction by dissolving the sodium methylate employed as the catalyst in methanol and to permit to drop the beta-methoxy isobutyric acid methyl ester into the heated solution at the same rate as the methacrylic acid methyl ester which is formed distills off. It was possible in this way to achieve yields of up to 92.5% based upon the beta-methoxy isobutyric acid methyl ester converted. However, the separation of a large excess of methanol from the methacrylic acid methyl ester by extractive or azeotropic distillation is rather costly.

In order to increase the velocity of the conversion, the alkaline cleavage of beta-alkoxy substituted esters with the formation of alpha-beta unsaturated esters was carried out in the gas phase according to U.S. Patent No. 2,457,225 employing basic alkali metal and alkaline earth metal compounds as catalysts. The cleavage products obtained are essentially free of acid but in view of the high temperatures required for the dealcoholysis considerable decomposition of the ester formed occurred which is evidenced by the strong yellow brown coloration of the cleavage product and the deposit of carbon on the catalyst which reduced its activity.

According to the invention it was found that unsaturated mono-carboxylic acid esters can be produced by dealcoholizing alpha- or beta-alkoxy or aryloxy substituted mono-carboxylic acid esters employing boron phosphate as the catalyst. The boron phosphate can be used as such as the catalyst or it can be supported on a carrier, preferably silica gel.

The process according to the invention is expediently carried out in the gas phase. Subatmospheric, normal or also superatmospheric pressures can be employed. It is advantageous when the reaction is carried out in the gas phase under a vacuum down to 20 mm. Hg, preferably between 50 and 200 mm. Hg. In addition, the presence of an inert gas, such as nitrogen, is of advantage. When the process is carried out in the gas phase, the vaporized material, preferably admixed with an inert gas, is passed through a heated tube filled with the catalyst. The heating of the catalyst tube can be effected by electric heating or with a heated gas which is passed over the tube with a blower to prevent local overheating.

The vapors after the cleavage and condensation are collected in a trap cooled to about 0° C. and the unsaturated mono-carboxylic acid esters are separated from the non-converted starting material and by-products by simple or azeotropic distillation. The components reaction mixture, however, also can be recovered by extractive distillation in a known manner, if desired, with the addition of polymerization inhibitors, such as nitrogen oxides.

The degree of cleavage the ether esters attained in the process according to the invention depends upon the reaction temperature, as well as the quantity of catalyst provided. The quantity of starting material charged to the catalyst per unit of time can be varied within wide limits and can be adapted to the conditions at hand.

The dealcoholysis or cleavage of the ether-esters according to the invention advantageously is carried out at temperatures between 180 and 270° C., preferably between 210 and 240° C.

The boron phosphate employed as the catalyst according to the invention can, for example, be prepared as follows:

(1) Fusing equimolecular quantities of $B_2O_3$ and $P_2O_5$ at 600–650° C. (Chemical Abstracts, 1953, page 10815i)
(2) Boiling equimolecular quantities of boric acid triethyl ester and $H_3PO_4$ under reflux for 10 minutes (Chemical Abstracts, 1954, page 5079a)
(3) From 1730 g. 85% $H_3PO_3$ and 824 g. boric acid (Houben-Weyl, Methoden der organischen Chemie, vol. IV, Part 2, pages 217–218)

The following examples will serve to illustrate a number of embodiments of the process according to the invention.

*Example 1*

Beta-methoxy propionic acid methyl ester was passed in vapor form at 210° C. over boron phosphate as the catalyst at a rate of 0.37 g. per cc. of catalyst per hour. The conversion was 80.3% with reference to the quantity of such ether-ester supplied to the catalyst. The yield of acrylic acid methyl ester was 95.5% with reference to the ether-ester converted. The quantity of acrylic acid produced calculated on acrylic acid+acrylic acid methyl ester was 5.5%. The crude cleavage product was completely colorless and the catalyst was free of carbon deposits.

*Example 2*

Beta-n-butoxy propionic acid butyl ester was passed in vapor form at 210° C. and a vacuum of 100 mm. Hg over a catalyst consisting of 20% of boron phosphate supported on silica gel. The rate at which such ether-ester was passed over the catalyst was 0.6 g. per cc. of catalyst per hour. The conversion was 82.1% with reference to the quantity of the ether-ester supplied to the catalyst. The yield of acrylic acid-n-butyl ester was 94.3% with reference to the ether-ester converted.

*Example 3*

Beta-(2-ethyl)-butoxy propionic acid-(2-ethyl)-butyl ester was passed in vapor form at a temperature of 220° C. and a vacuum of 100 mm. Hg over boron phosphate as the catalyst. The rate at which such ether-ester was passed over the catalyst was 0.9 g. per cc. of catalyst per hour. The conversion was 80.9% with reference to the quantity of the ether-ester supplied to the catalyst. The yield of acrylic acid-(2-ethyl)-butyl ester was 92.5% with reference to the ether-ester converted.

Example 4

Beta-methoxy propionic acid-n-butyl ester was passed in vapor form at a temperature of 210° C. and a vacuum of 100 mm. Hg over boron phosphate as the catalyst. The rate at which such ether-ester was passed over the catalyst was 0.7 g. per cc. of catalyst per hour. The conversion was 79.0% with reference to the quantity of the ether-ester supplied to the catalyst. The yield of acrylic acid-n-butyl ester was 94.2% with reference to the ether-ester converted.

Example 5

Beta-methoxy propionic acid-(2-ethyl)-butyl ester was passed in vapor form at a temperature of 225° C. and at a vacuum of 100 mm. Hg over boron phosphate as the catalyst. The rate at which such ether ester was passed over the catalyst was 0.9 g. per cc. of catalyst per hour. The conversion was 83% with reference to the quantity of the ether-ester supplied to the catalyst. The yield of acrylic acid-(2-ethyl)-butyl ester was 92.0% with reference to the ether-ester converted.

Example 6

Beta-methoxy isobutyric acid methyl ester was passed in vapor form at a temperature of 210° C. over boron phosphate as the catalyst. The rate at which such ether-ester was passed over the catalyst was 1 g. per cc. of catalyst per hour. The conversion was 78.0% with reference to the quantity of ether-ester supplied to the catalyst. The yield of methyl methacrylate was 94.1% with reference to the ether-ester converted.

Example 7

Beta-n-octoxy propionic acid-n-octyl ester was passed in vapor form at a temperature of 210° C. and at a vacuum of 10 mm. Hg over a catalyst consisting of 20% of boron phosphate supported on silica gel. The rate at which such ether-ester was passed over the catalyst was 1.2 g. per cc. of catalyst per hour. The conversion was 80.6% with reference to the quantity of ether-ester supplied to the catalyst. The yield of acrylic acid-n-octyl ester was 90.3% with reference to the ether-ester converted.

We claim:
1. A process for the production of $\alpha,\beta$-unsaturated monocarboxylic acid esters which comprises contacting a $\beta$-alkoxy monocarboxylic acid ester with boron phosphate as a catalyst at a temperature between 180 and 270° C. to form an $\alpha,\beta$-unsaturated monocarboxylic acid ester and an alcohol.
2. The process of claim 1 in which said boron phosphate is supported on a carrier.
3. The process of claim 1 in which said boron phosphate is supported on silica gel.
4. The process of claim 1 in which said $\beta$-alkoxy monocarboxylic acid ester is contacted with the catalyst at temperatures between 210 and 240° C.
5. The process of claim 1 in which said $\beta$-alkoxy monocarboxylic acid ester is a $\beta$-alkoxy-substituted propionic acid alkyl ester.
6. The process of claim 1 in which said $\beta$-alkoxy monocarboxylic acid ester is an $\alpha$-alkyl-$\beta$-alkoxy-substituted propionic acid alkyl ester.
7. The process of claim 1 in which said $\beta$-alkoxy monocarboxylic acid ester is an $\alpha$-methyl-$\beta$-alkoxy-substituted propionic acid alkyl ester.

References Cited in the file of this patent

UNITED STATES PATENTS

| | | |
|---|---|---|
| 2,376,704 | Kung | May 22, 1945 |
| 2,457,225 | Gresham | Dec. 28, 1945 |
| 2,816,921 | Gardner | Dec. 17, 1957 |

FOREIGN PATENTS

| | | |
|---|---|---|
| 589,709 | Great Britain | June 27, 1947 |

OTHER REFERENCES

Burwell: Chem. Rev. 54, 615–685 (1954), pp. 622, 628–629, 638, 660 and 672–673 especially relied on.

Fuson: "Advanced Organic Chemistry," 1950, pp. 95–97.